United States Patent Office 3,817,749
Patented June 18, 1974

3,817,749
PHOTOCONDUCTIVE SUBSTITUTED POLY (1-VINYL-2-PHENYLBENZIMIDAZOLES)
Makoto Kitahara, Shozo Ishikawa, Tetsuo Arita, and Masaaki Dohi, Tokyo, Japan, assignors to Copyer Co., Ltd., Tokyo, Japan
No Drawing. Filed Dec. 29, 1971, Ser. No. 213,817
Claims priority, application Japan, Dec. 29, 1970, 46/121,153; Aug. 17, 1971, 46/92,444
Int. Cl. C03g 5/06
U.S. Cl. 96—1.5         1 Claim

ABSTRACT OF THE DISCLOSURE

A poly(1-vinyl-2-phenylbenzimidazole) having the following formula

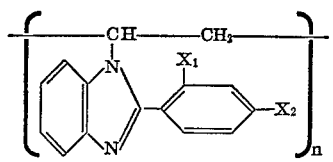

wherein $X_1$ and $X_2$ each represent a hydrogen atom or a halogen atom and $n$, which shows the polymerization degree, is an integer larger than 1, or a poly[1-vinyl-2-(4'-substituted aminophenyl) benzimidazole] having the following formula

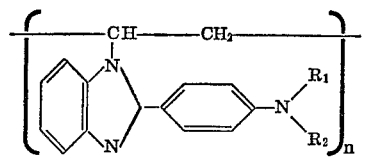

wherein $R_1$ and $R_2$ each represent an alkyl group, an aryl group, an aralkyl group, or $R_1$ and $R_2$ may form a cyclic amino group or a heterocyclic amino group together with a nitrogen atom has a film-forming property and a high photosensitivity and thus is suitably used as a photosensitive material for electrophotographic photosensitive elements.

BACKGROUND OF THE INVENTION

Field of the invention

The present invention relates to a novel poly(1-vinyl-2-phenylbenzimidazole) and a novel poly[1-vinyl-2-(4'-substituted aminophenyl) benzimidazole] and a process for preparing each of the above polymers. The polymers have a film-forming property and a high photosensitivity and are suitably used as photosensitive materials for electrophotographic photosensitive elements. Thus, the invention relates further to an electrophotographic photosensitive element having the photosensitive layer of the above polymer.

Description of the prior art

An electrophotographic system is a reproducing system utilizing an electrostatic phenomenon and a photoconductive phenomenon of a material and because in such a system reproductions can be obtained easily and rapidly from a both-side printed original, the electrophotographic system is most widely used among various other reproducing or printing systems. In the electrophotographic system ZnO or Se has hitherto been mainly used as the material showing the aforesaid phenomena.

Recently, however, practically usable organic photoconductive materials have been developed. Typical examples of such known organic photoconductive materials include anthracene, carbazole, perillene, tetrabenzyl - p-phenylenediamine, polyvinylcarbazole, polyacenaphthylene, polyvinyl anthracene, and the like.

Different from the inorganic photoconductive materials such as ZnO and Se, such an organic photoconductive material has such merits as a light transparency, a flexibility, a light weight, and a high resolving power. For preparing electrophotographic photosensitive elements using such an organic photoconductive material, the following methods are usually employed;

(1) a method wherein a coating composition prepared by dispersing a powder of the organic photoconductive material in a binder is applied to a conductive base,
(2) a method wherein an organic photoconductive material having a good compatibility with a polymer binder is incorporated in the binder and the mixture is applied to a conductive base, and
(3) a method wherein an organic photoconductive material having a film-forming property as it is applied to a conductive base.

Among the above methods, the type (3) can exhibit most effectively the merits of the organic photoconductive material. As the organic photoconductive material capable of being employed for the purpose, there are known polyvinylcarbazole and the derivatives thereof.

Also, as the organic photoconductive materials used in the type (2), a 2(4'-substituted aminophenyl)benzimidazole compound is disclosed in, e.g., Japanese Patent Publication No. 11,219/60 granted to Kalle A. G. and it is reported by Morimoto et al. (Electrophotography; Vol. 4, pages 13–19) that the above imidazole compound has excellent electrophotographic properties. However, since such a material itself has no film-forming property, it must be used together with a proper binder, which results in the reduction of sensitivity of the electrophotographic photosensitive element prepared therefrom.

SUMMARY OF THE INVENTION

The present invention relates generally to a novel polymer and a process for producing the polymer. The invention relates, in particular, to a novel polymer having a film-forming property and a high photosensitivity and thus being suitably used as a photosensitive material for electrophotographic photosensitive elements. More particularly, the present invention relates to a novel polymer represented by one of the following formulae

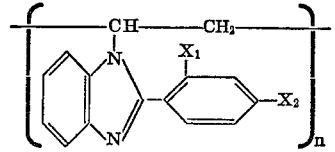

wherein $X_1$ and $X_2$ each represents a hydrogen atom or a halogen atom such as a chlorine atom, a bromine atom, and an iodine atom and $n$, which shows the polymerization degree, is an integer larger than 1, and

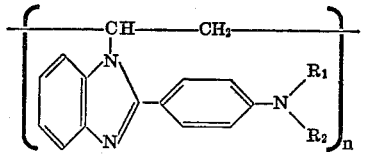

wherein $R_1$ and $R_2$ each represents an alkyl group such as a methyl group, an ethyl group, and a propyl group; an aryl group such as a phenyl group; or an aralkyl group such as a benzyl group; or said $R_1$ and $R_2$ may form, together with a nitrogen atom, a cyclic amino group or a heterocyclic amino group, such as a morpholino group, a pyrrolidino group, and a piperidino group; and $n$ has the same significance as above and a process for producing the polymer.

The present invention relates further to a photosensitive material for electrophotography mainly consisting of the novel polymer and also to an electrophotographic photosensitive element having coated on a support the photosensitive layer of the polymer.

The film-forming property of the polymer can be improved by increasing the molecular weight or the polymerization degree of the polymer.

As the results of various investigations, the inventors have found that a polymer prepared by vinylating the 1-position of 2-phenylbenzimidazole or 2(4'-substituted aminophenyl)benzimidazole each having or without having a halogen substitutent or halogen substitutents at one or both of the 2'-position and the 4'-position of the phenyl group thereof and then polymerizing the compound has an excellent photosensitivity. The polymer is a faint yellow organic material. Because the organic photoconductive material has a film-forming property, it can provide an electrophotographic photosensitive element having a high photosensitivity owing to the unnecessity of employing any binder. Moreover, the polymer of the present invention has also excellent light transparency, resolving power, and flexibility, which make the polymer more advantageous as the photosensitive materials. Also, as mentioned before, the film-forming property of the polymer can be improved by increasing the polymerization degree of the polymer.

Accordingly, owing to the above-mentioned excellent properties as well as other properties as organic material, the polymer of the present invention can be utilized in wide application fields, for example, as the photosensitive materials for electrophotographic photosensitive sheets, photosensitive sheets for reproducing originals of diazo-type photographic microfilms, high speed recording papers at the output of a computer, and recording papers for facsimile system.

Now, examples of preparing the poly(1-vinyl-2-phenylbenzimidazole) and halogen-substitutes thereof of the present invention will be illustrated below. In addition, the formation of the polymer in each of the following examples was confirmed by means of an infrared absorption spectra. That is, a vinyl monomer has a specific absorption based on the vibration of the C=C bond of the vinyl radical near 1640 cm.$^{-1}$ but the absorption is greatly vanished when the polymerization reaction of the vinyl monomer proceeds. Thus, by observing the absorption, the formation of the polymer was confirmed.

EXAMPLE 1

Preparation of 1-vinyl-2-phenylbenzimidazole

In 300 g. of N-methylpyrrolidone was dissolved 37 g. (0.19 mol) of 2-phenylbenzimidazole prepared by an ordinary manner and then after adding further 0.5 g. (0.019 gram atom) of potassium to the solution, the mixture was charged in a 500 milliliter autoclave. While stirring the system, an acetylene gas was pressed in the autoclave until the pressure therein reached 1.8 kg./cm.$^2$, the temperature of the system was increased gradually by heating, and the reaction was carried out for four hours at 180–185° C. After allowing to cool overnight the reaction product, the product liquid with withdrawn from the autoclave and distilled under a reduced pressure to provide 17.2 g. of a viscous yellow-green liquid having a boiling point of 156–160.5° C./3-4 mm. Hg. The yield for the product was 41% based on the amount of the 2-phenylbenzimidazole supplied.

EXAMPLE 2

Preparation of poly(1-vinyl-2-phenylbenzimidazole)

In a 100 milliliter three-necked flask was charged 9.6 g. of the 1-vinyl-2-phenylbenzimidazole prepared in Example 1 and then the flask was heated while introducing a nitrogen gas in the flask. When the temperature of the liquid in the flask reached 125° C., 120 mg. of α,α'-azobis-isobutyronitrile was added thereto and they were reacted for five hours. After cooling the reaction product, a solid product thus obtained was crushed, washed with acetone, and dried. The product was dissolved in methylene chloride and acetone was added to the solution, whereby a solid material was precipitated, which was recovered by filtration and dried to provide 2.4 g. of the faint yellow polymer having a melting point of about 370° C. with a yield of 25%.

EXAMPLE 3

Preparation of 2(4'-chlorophenyl)benzimidazole

In one liter flask were charged 300 ml. of ethanol, 51.8 g. (0.48 mol) of o-phenylenediamine and 67.5 g. (0.48 mol) of p-chlorobenzaldehyde and they were reacted for one hour at the reflux temperature. Thereafter, 20.2 g. (0.12 mol) of m-dinitrobenzene was added to the system and the reaction was further conducted for 9 hours. After cooling the reaction product to room temperature, the solid product thus formed was recovered by filtration. The filtrate was concentrated to recover further a solid product therefrom. The solid products thus recovered were combined and recrystallized from a mixture of ethanol and methanol to provide 58 g. of the orange acicular crystal of the aimed product having a melting point of 284–286.5° C. The yield for the product was 47.2% based on the amount of the o-phenylenediamine used in the reaction.

EXAMPLE 4

Preparation of 1-vinyl-2(4'-chlorophenyl)benzimidazole

By the same manner as in Example 1, 45.7 g. (0.2 mol) of 2(4'-chlorophenyl)benzimidazole, 300 g. of N-methylpyrrolidone, 0.8 g. (0.02 gram atom) of potassium, and acetylene were reacted for four hours at 190° C. After allowing to cool overnight, water was added to the reaction product liquor, whereby a solid material deposited (precipitated), which was recovered by filtration, dried, and then recrystallized from a mixture of water and methanol and then from acetone to provide 21.5 g. of the white powder of the aimed product having a melting point of 127.5–128° C. The yield for the product was 42.3% based on the amount of the 2(4'-chlorophenyl)benzimidazole used in the reaction.

EXAMPLE 5

Preparation of poly[1-vinyl-2(4'-chlorophenyl)benzimidazole]

In 100 milliliter three-necked flask was charged 15.0 g. of 1-vinyl-2(4'-chlorophenyl)benzimidazole and the compound was melted by heating while introducing a nitrogen gas in the flask. When the temperature of heating bath reached 130° C., 225 mg. of α,α'-azobisisobutyronitrile was added to the melt and then they were reacted for 3 hours at 130° C. After cooling the reaction product, a solid product thus formed was crushed, washed with acetone, and dried. The product was dissolved in methylene chloride and the solution was poured in methanol, whereby a solid material deposited (precipitated), which was recovered by filtration and dried to provide 4.2 g. of the white powder of the aimed polymer having a melting point of 370° C. with a yield of 28%.

EXAMPLE 6

Preparation of 2(2',4'-dichlorophenyl)benzimidazole

To 970 g. of polyphosphoric acid were added 43.2 g. (0.4 mol) of o-phenylenediamine and 76.4 g. (0.4 mol) of 2,4-dichlorobenzoic acid to provide a pasty mixture. The temperature of the mixture was rised to 245° C. over a two hour period and they were reacted for four hours at 245–249° C. After cooling the reaction product liquid to 100° C., the reaction product liquid was poured in 5 liters of water and a solid material formed was recovered by filtration. The filtrate was neutralized with 23% aqueous ammonia and a solid material formed was further recovered. The both solid materials were combined and after drying, recrystallized from benzene and then toluene to provide 80.0 g. of the white acicular crystal of the aimed product having a melting point of 223–224° C. The yield for the product was 76% based on the amount of o-phenylene-diamine used in the reaction.

EXAMPLE 7

Preparation of 1-vinyl-2(2',4'-dichlorophenyl)benzimidazole

By the same procedure as in Example 1, 52.6 g. (0.2 mol) of 2(2',4'-dichlorophenyl)benzimidazole, 270 ml. of N-methylpyrrolidone, 0.8 g. (0.02 gram atom) of potassium, and acetylene were reacted for four hours at 178–182° C. After allowing to cool overnight, the reaction product liquor was poured in water and the solid thus formed was recovered, dried and recrystallized from a mixture of water and ethanol to provide 14.4 g. of the white crystal of the aimed product having a melting point of 106.5–107.5° C. The yield for the product was 25.0% based on the amount of 2(2',4'-dichlorophenyl)benzimidazole.

EXAMPLE 8

Preparation of poly[1-vinyl-2(2',4'-dichlorophenyl)benzimidazole]

In 100 milliliter three-necked flask was charged 12.0 g. of 1-vinyl-2-(2',4'-dichlorophenyl)benzimidazole and then the compound was melted by heating while introducing a nitrogen gas in the flask. When the temperature of the heating bath reached 120° C., 120 mg. of $\alpha,\alpha'$-azobis-isobutyronitrile was added to the melt and they were reacted for two hours at 120° C. After cooling the reaction product, the massive product was withdrawn, pulverized finely, and then washed with benzene. The product was dissolved in methylene chloride, the solution was poured in acetone, and the solid material thus formed was recovered by filtration and dried to provide 6.3 g. of the white powder of the aimed polymer with a yield of 52.5%.

EXAMPLE 9

Preparation of 2(4'-bromophenyl)benzimidazole]

The same procedure as in Example 3 was followed using 43.7 g. (0.405 mol) of o-phenylenediamine, 75.0 g. (0.405 mol) of p-bromobenzaudehyde, 300 ml. of ethanol, and 20.2 g. (0.12 mol) of m-dinitrobenzene. By recrystallizing the crude product thus obtained from dioxane, 50.0 g. of the white acicular crystal of the aimed product having a melting point of 285–285.5° C. was obtained. The yield for the product was 45.3% based on the amount of the o-phenylenediamine used in the reaction.

EXAMPLE 10

Preparation of 1-vinyl-2(4'-bromophenyl)benzimidazole

The same procedure as in Example 1 was followed using 45.0 g. (0.16 mol) of 2(4'-bromophenyl)benzimidazole, 250 ml. of n-methylpyrrolidone, 0.64 g. (0.016 gram atom) of potassium, and acetylene. In this case, however, the reaction conditions were 187° C. and four hours. After allowing to cool, the reaction product liquor was poured in water and solid product thus formed was recovered, dried, and recrystallized from a mixture of water and ethanol to provide 12.2 g. of the white acicular crystal of the aimed product having a melting point of 106–107.5° C. The yield of the product was 24.8% based on the amount of the 2(4'-bromophenyl)benzimidazole used in the reaction.

EXAMPLE 11

Preparation of poly[1-vinyl-2(4'-bromophenyl)benzimidazole]

In 100 milliliter three-necked flask was charged 12.0 g. of 1-vinyl-2(4'-bromophenyl)benzimidazole and then the compound was melted by heating while introducing a nitrogen gas in the flask. When the temperature of the heating bath reached 115° C., 120 mg. of $\alpha,\alpha'$-azobis-isobutyronitrile was added to the melt and they were reacted for four hours at a bath temperature of 115°C. After cooling the reaction product, a solid product thus obtained was pulverized, washed with acetone, and dried. The product was then dissolved in methylene chloride, the solution thus obtained was poured in acetone, and the solid material formed was recovered by filtration and dried to provide 7.5 g. of the white powder of the aimed polymer having a melting point of 332° C. with a yield of 62.5%.

EXAMPLE 12

Preparation of 1-vinyl-2-(4'-dimethylaminophenyl)benzimidazole

In 500 ml. of N-methylpyrrolidone was dissolved 88.9 g. of purified 2(4'-dimethylaminophenyl)benzimidazole and after adding metallic potassium as a catalyst, the benzimidazole was caused to react with an acetylene gas in an autoclave at 195° C. The reaction product liquor obtained was subjected to a distillation under a reduced pressure by an ordinary method to remove the greater part of the N-methylpyrrolidone. The remaining dense liquor was poured in water and the solid product thus formed was recovered by filtration, dried, and recrystallized from ligroin to provide 19.5 g. of the white acicular crystal of the aimed product having a melting point of 104.5° C.

EXAMPLE 13

Preparation of poly[1-vinyl-2(4'-dimethylaminophenyl)benzimidazole]

To 3 g. of 1-vinyl-2(4'-dimethylaminophenyl)benzimidazole obtained in Example 12 was added 30 mg. of $\alpha,\alpha'$-azobis-isobutyronitrile as a polymerization initiator and they were reacted for 16 hours at 150° C. in a nitrogen gas atmosphere. Then, by washing the reaction product with hot ligroin, 1.9 of the faint-yellow aimed polymer was obtained.

The polymers of the invention prepared in the aforesaid examples can be dissolved well in methylene chloride and thus by applying a methylene chloride solution of the polymer to the surface of a suitable support, an uniform thin photosensitive layer can be formed on the support. As the support for the purpose, paper sheets having the surfaces subjected to a conductive treatment and an organic solvent water proof treatment, metallic sheets, and various synthetic resin films subjected to a conductive treatment.

The amount of the coated layer of the photosensitive polymer is, e.g., in a range of 2–20 g. per square meter. In this case, a sensitizing dye, which is conventionally used as sensitizer in the field, such as Crystal Violet, Methyl Violet, Victoria Blue, Brilliant Green, Rhodamine B, Rhodamine 6G, Erythrosine, Phloxine, Rose Bengale, Fluorescene, or Methylene Blue and may be used. Moreover, there may be used together an electron attractive material having an excellent sensitizing effect, such as tetracyanoethylene, chloranil, bromanil, benzoquinone, anthraquinone, naphthoquinone, 1 - nitroanthraquinone, 2 - chloroanthraquinone, 1,5 - dichloroanthraquinone, 2-methylanthraquinone, 2,4,7-trinitrofluorenone, and 2,4,7-trinitrophenanthraquinone.

Furthermore, if it is desired to further improve the electrostatic property, the strength of the photosensitive layer, etc., other resin may be incorporated in the polymer.

By passing the photosensitive sheet thus obtained in the dark under a corona discharging device controlled to −6 kv., the surface, of the photosensitive sheet can be charged to a potential of from −300 volts to −900 volts. When the photosensitive sheet thus charged is exposed to a proper light such as a tungsten lamp, or an arc lamp behind a positive pattern formed on a transparent film, the charge disappears at the exposed portions and when the surface of the photosensitive sheet is treated in a positively charged liquid developer or developed by a positively charged developing powder called usually "toner" in the dark, a positive image of the original pattern is obtained. When the toner is used, the photosensitive sheet having the toner image thereon is passed through a heating means, whereby the positive toner image is welded to the surface thereof.

Now, the examples of using the photosensitive polymers of the present invention will be illustrated practically.

EXAMPLE 14

In 20 ml. of methylene chloride were dissolved 2 g. of poly[1-vinyl-2(4' - bromophenyl)benzimidazole] and 0.6 g. of 2,4,7-trinitrofluorenone and the solution was applied to a paper sheet subjected preliminary to a solvent proof treatment and a conductive treatment and having an intrinsic electric resistance of lower than $10^9$ ohm-cm. by an ordinary manner such as a brush, a spray method or an immersion method in a thickness of 7 microns.

The surface of the photosensitive sheet or element thus prepared was negatively charged by means of a corona-discharging device controlled to −6 kv. and then exposed behind a transparent film having a positive pattern to a tungsten lamp of 40 watts for 5 seconds with an interval of 40 cm. Then, the sheet thus exposed was processed in a commercially available liquid developer (a developer for KIC 3000 made by Iwasaki Tsushinki K.K.), whereby an excellent image to the original was obtained. In addition, the half decay exposure amount of the photosensitive sheet measured by means of an electrostatic copying paper test machine Model SP-428 made by Kawaguchi Denki K. K. was 750 lux.sec.

EXAMPLE 15

In 20 ml. of methylene chloride were dissolved 2 g. of poly-[1-vinyl-2(4' - chlorophenyl) benzimidazole], 0.6 g. of 1-nitroanthraquinone, and 2 mg. of crystal violet. The resulting coating solution was coated on a 7-micron thick aluminum plate whose surface had been cleansed, by the rotary coating method to form a photographic plate. The photographic plate was subjected to corona discharge in a customary manner at a voltage of −6 kv. to give it a negative load. It was then exposed for one second under a positive pattern using a 40 w. tungsten lamp at a distance of 40 cm., and then developer powders consisting of glass balls and commercially available toner (Ubix 480 toner, product of Konishiroku Photographic Co.) or powders (obtained by heat-melting carbon black, alkyd resin, and a small amount of a dye, followed by powdering on the plate) thereby to adhere the positively charged toner to the non-exposed portion and thus form an image. Paper was superposed thereon, and the image was transferred by a customary method. The transferred paper was heated to fix the image. There was obtained an image of high contrast faithful to the original pattern. Furthermore, the resulting photographic plate could be repeatedly used.

EXAMPLE 16

In 20 ml. of methylene chloride were dissolved 2 g. of poly[1-vinyl-2(2',4' - dichlorophenyl)benzimidazole] and 0.6 g. of chloroanil. A series of coating, drying, charging, exposing (3 seconds), and developing were performed in the same way as set forth in Example 1. There was obtained an excellent image faithful to the original pattern. The half decay exposure amount was 600 lux.sec.

EXAMPLE 17

In 20 ml. of methylene chloride were dissolved 2 g. of poly(1 - vinyl-2-phenylbenzimidazole) and 20 mg. of 2,4,7-trinitrofluorenone and by the same manners as in Example 1, the coating, drying, charging, exposing (5 min.), and developing procedures were conducted and an excellent image of the original was obtained.

EXAMPLE 18

In 10 ml. of methylene chloride was dissolved 2 g. of poly[1 - vinyl-2(4'-dimethylaminophenyl)benzimidazole] and the solution was applied to a paper subjected preliminary to a solvent proof treatment and a conductive treatment and having an intrinsic electric resistance of lower than $10^9$ ohm-cm. by means of an ordinary way such as a brush, a spray, or an immersion.

The photosensitive sheet thus prepared was negatively charged by means of a corona charging device controlled to −6 kv. and then exposed behind a transparent film having a positive pattern to an incandescent lamp of 40 watts for 40 seconds. When the sheet thus exposed was processed in a commercially available liquid developer, an excellent image of the original was obtained.

EXAMPLE 19

In 10 ml. of methylene chloride were dissolved 2 g. of poly[1-vinyl - 2(4' - dimethylaminophenyl)benzimidazole] and 0.2 g. of 2,4,7-trinitrofluorenon (sensitizer) and the 2 mg. of Crystal Violet was added to the solution. The solution thus prepared was applied to a paper sheet subjected to a solvent proof treatment and a conductive treatment and having an intrinsic electric resistance of lower than $10^9$ ohm-cm.

The surface of the photosensitive sheet thus obtained was negatively charged in the dark by means of a corona charging device controlled by −6 kv. and then exposed behind a transparent film having a positive pattern to an incandescent lamp of 40 watts. The sheet was then developed in a commercially available positively charged liquid developer in the dark, whereby an excellent image of the original was obtained.

What is claimed is:

1. A photoconductive element having coated on a support a layer of a photoconductive material for electrophotography comprising a poly(1-vinyl-2-phenylbenzimidazole) represented by the following formula

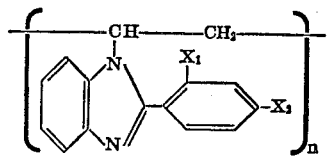

wherein $X_1$ and $X_2$ each represents a hydrogen atom or a halogen atom and $n$, which shows the polymerization degree, is an integer larger than 1, and an electron attraction material.

References Cited
UNITED STATES PATENTS

| | | | |
|---|---|---|---|
| 3,257,204 | 6/1966 | Sus et al. | 96—1.5 |
| 2,606,175 | 8/1952 | Price | 260—88.3 R |
| 3,159,483 | 12/1964 | Behmenburg et al. | 96—1.5 |
| 3,232,755 | 2/1966 | Hoegl et al. | 96—1.5 |
| 3,418,116 | 12/1968 | Ilami et al. | 96—1.5 |
| 3,230,081 | 1/1966 | Tomalek et al. | 96—1.5 |
| 3,037,861 | 6/1962 | Hoegl et al. | 96—1.5 |
| 3,554,741 | 1/1971 | Gipstein et al. | 96—1 R |
| 3,488,294 | 1/1970 | Annand et al. | 260—88.3 R |

ROLAND E. MARTIN, Jr., Primary Examiner

U.S. Cl. X.R.

96—1.6; 260—88.3 R